United States Patent [19]

Schuplin

[11] Patent Number: 5,211,580
[45] Date of Patent: May 18, 1993

[54] UNIVERSAL BACKPLATE FOR ELECTRICAL OUTLETS

[75] Inventor: Jerome T. Schuplin, Parma Hts., Ohio

[73] Assignee: G.B. Electrical, Inc., Lorain, Ohio

[21] Appl. No.: 899,879

[22] Filed: Jul. 15, 1992

Related U.S. Application Data

[62] Division of Ser. No. 758,565, Sep. 12, 1991, Pat. No. 5,158,478.

[51] Int. Cl.[5] .......................................... H01R 13/74
[52] U.S. Cl. .................................... 439/538; 220/3.5; 248/27.1; 248/906
[58] Field of Search .......................... 174/48, 58, 66; 220/3.5, 3.6; 248/27.1, 906; 439/536, 538, 535, 537

[56] References Cited

U.S. PATENT DOCUMENTS

| | | | |
|---|---|---|---|
| 2,788,187 | 4/1957 | Cookson et al. | 248/27.1 |
| 3,596,860 | 8/1971 | MacKay | 248/216 |
| 4,533,060 | 8/1985 | Medlin | 220/3.5 |
| 4,576,431 | 3/1986 | Thayer | 439/560 |
| 4,673,235 | 6/1987 | Conley | 439/536 |
| 4,685,035 | 8/1987 | Nanjoh | 174/58 |
| 4,863,399 | 9/1989 | Medlin | 439/538 |
| 4,955,825 | 9/1990 | Groth et al. | 220/3.5 |

OTHER PUBLICATIONS

Caddy Fasteners, MP-1 Plate Mounting Bracket and MP-2 Plate Mounting Bracket, Caddy Fasteners Newsletter.

*Primary Examiner*—Gary F. Paumen
*Attorney, Agent, or Firm*—Oldham, Oldham & Wilson

[57] ABSTRACT

A backplate for securing low voltage electrical sockets includes a flat plate with tabs formed, and adapted for repositioning, by first, second or third bend lines, and the tabs are adapted for bending to form a support bracket having a rectangular central opening surrounded by sidewalls with the contiguous tabs essentially orthogonal to the plane of the plate. The support bracket is provided with fastener holes positioned to remain in the plane of the plate after bending the tab. The tabs are provided with variously configured bend lines whereby the tabs can be repositioned behind a wall panel with a clasping action for securing the support bracket to the wall panel.

1 Claim, 5 Drawing Sheets

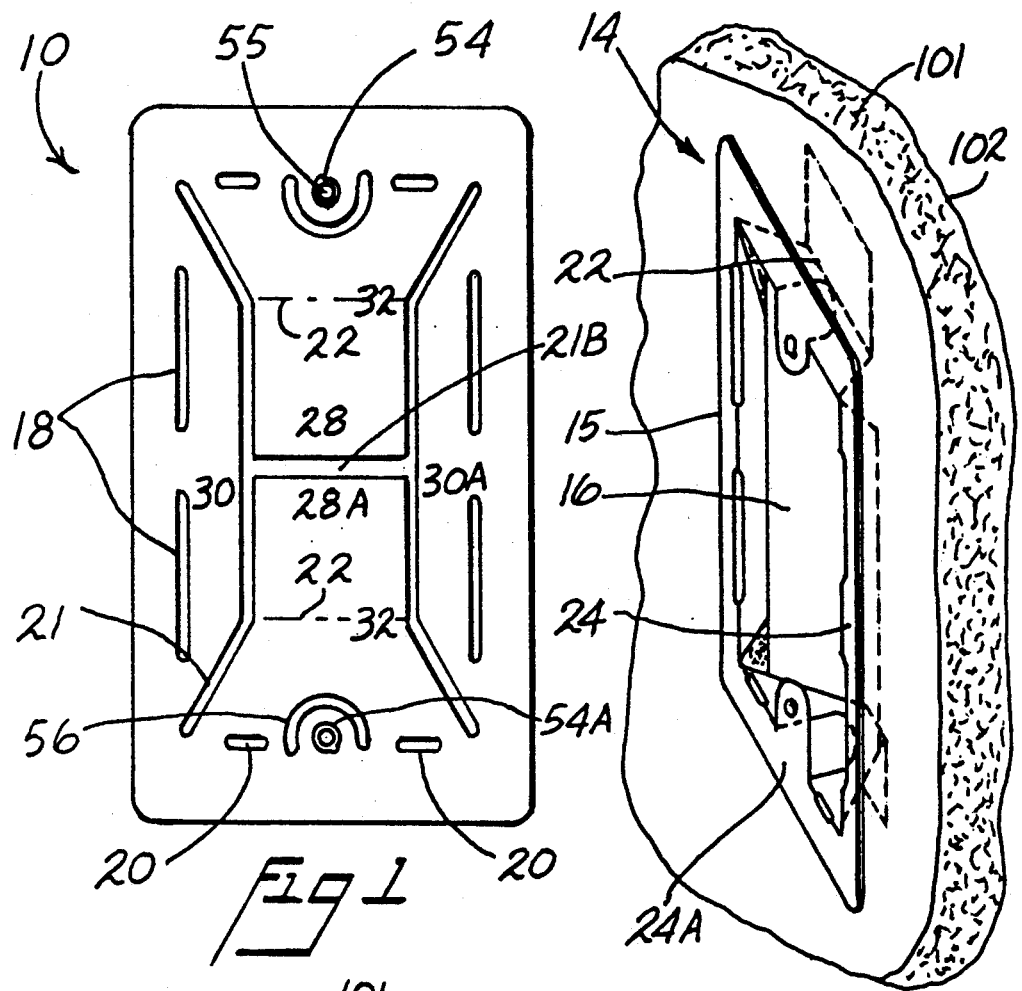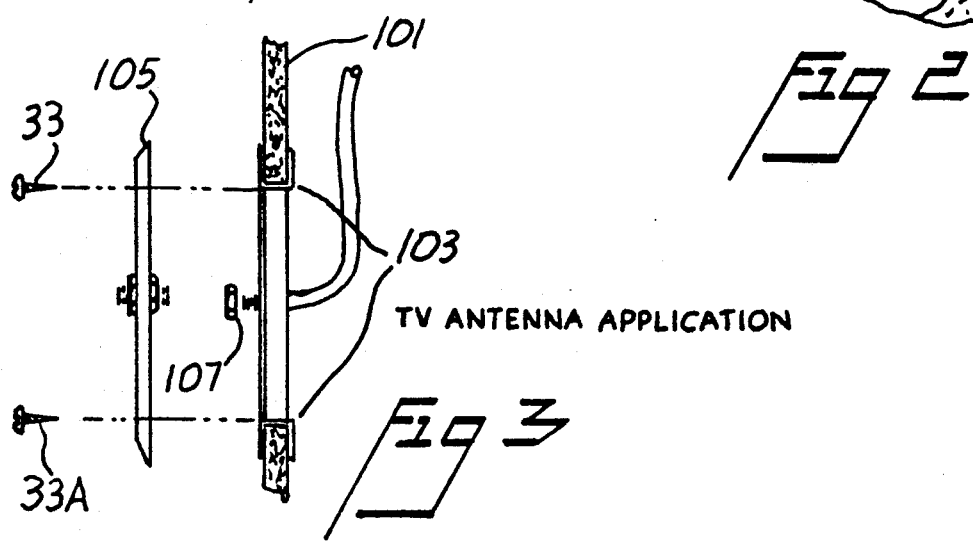

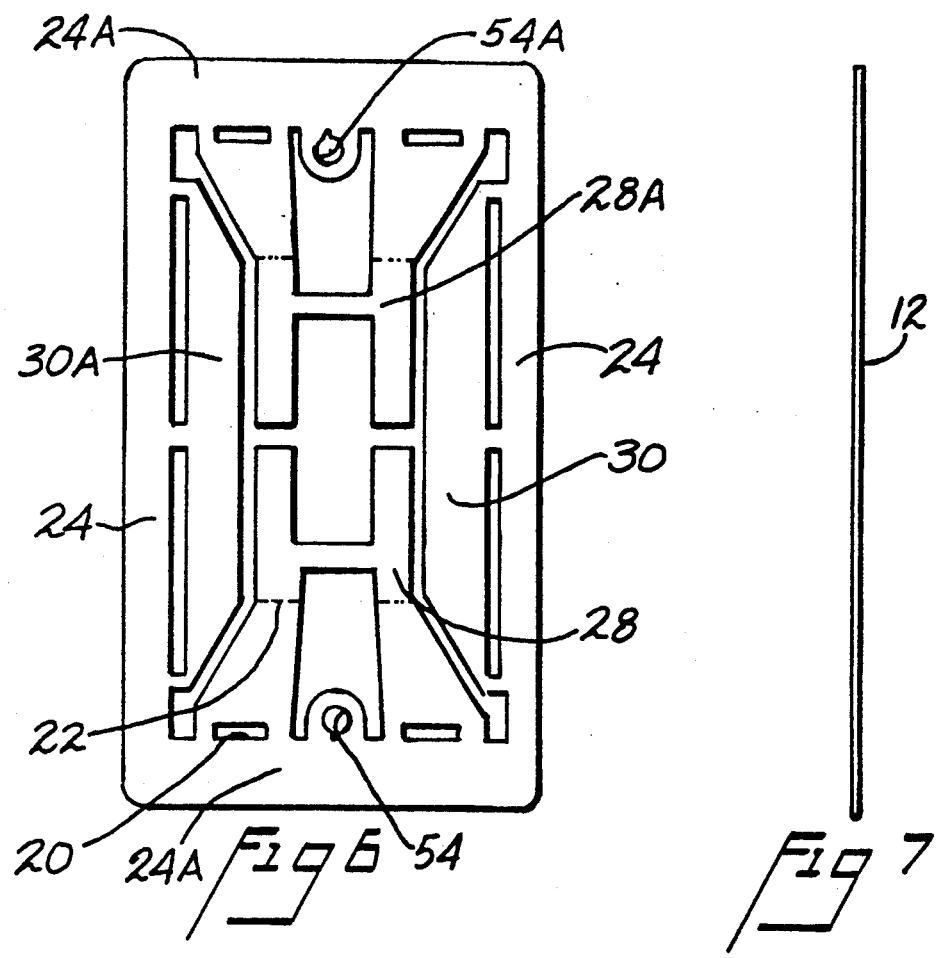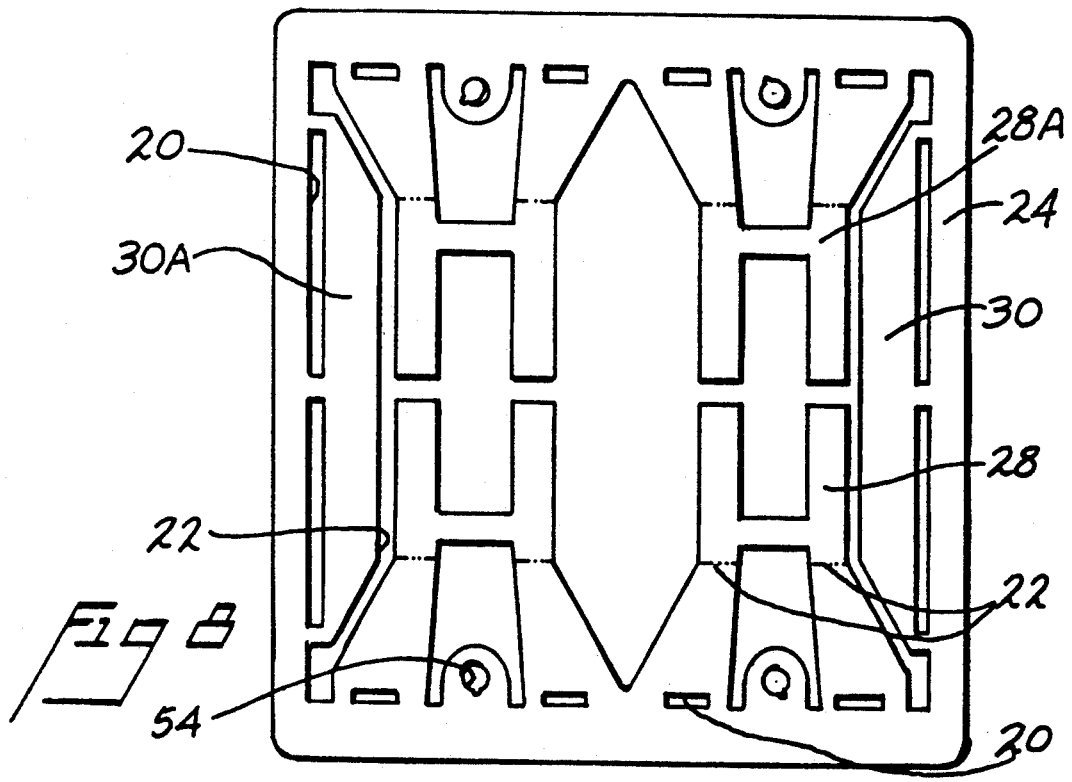

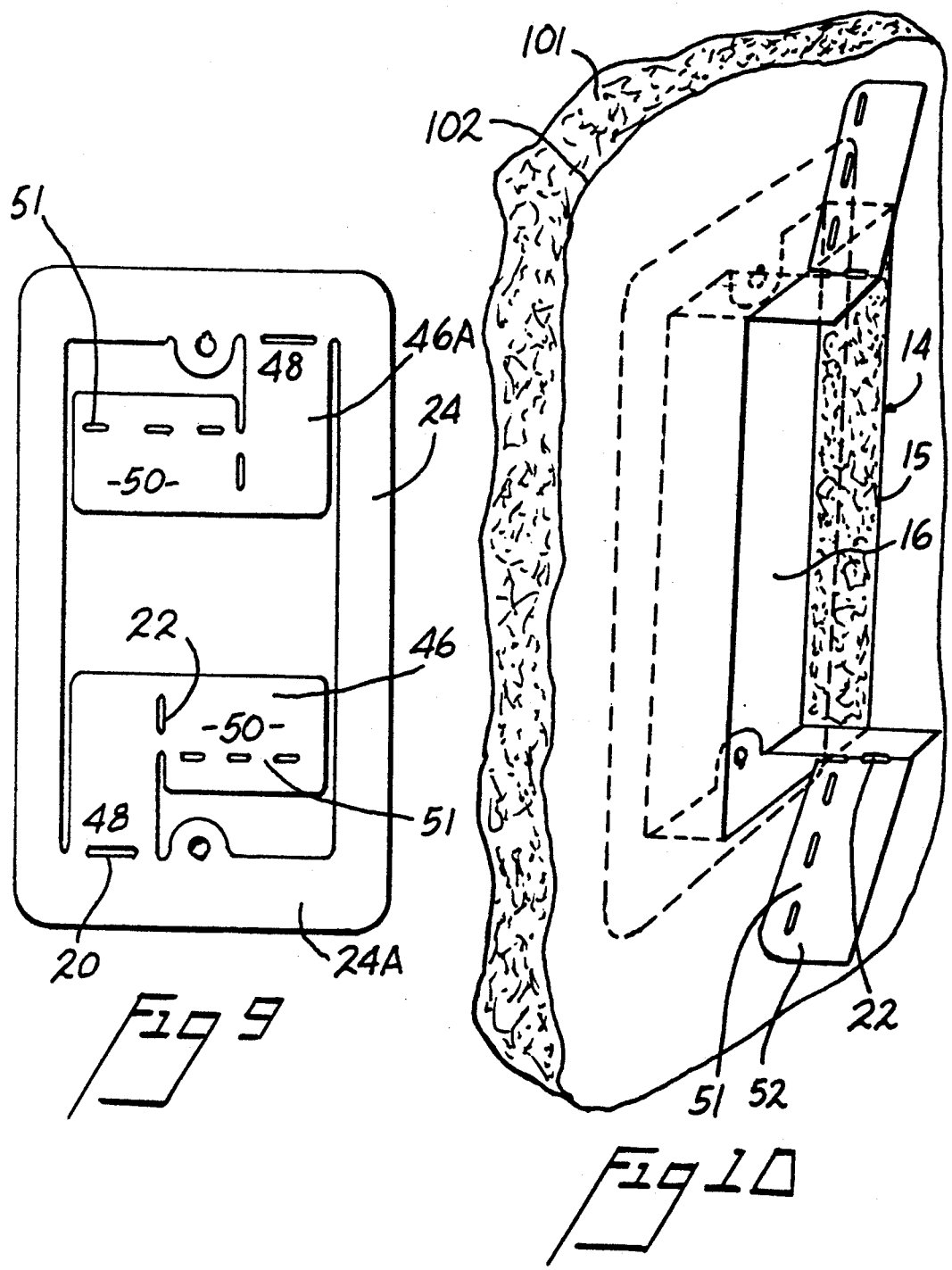

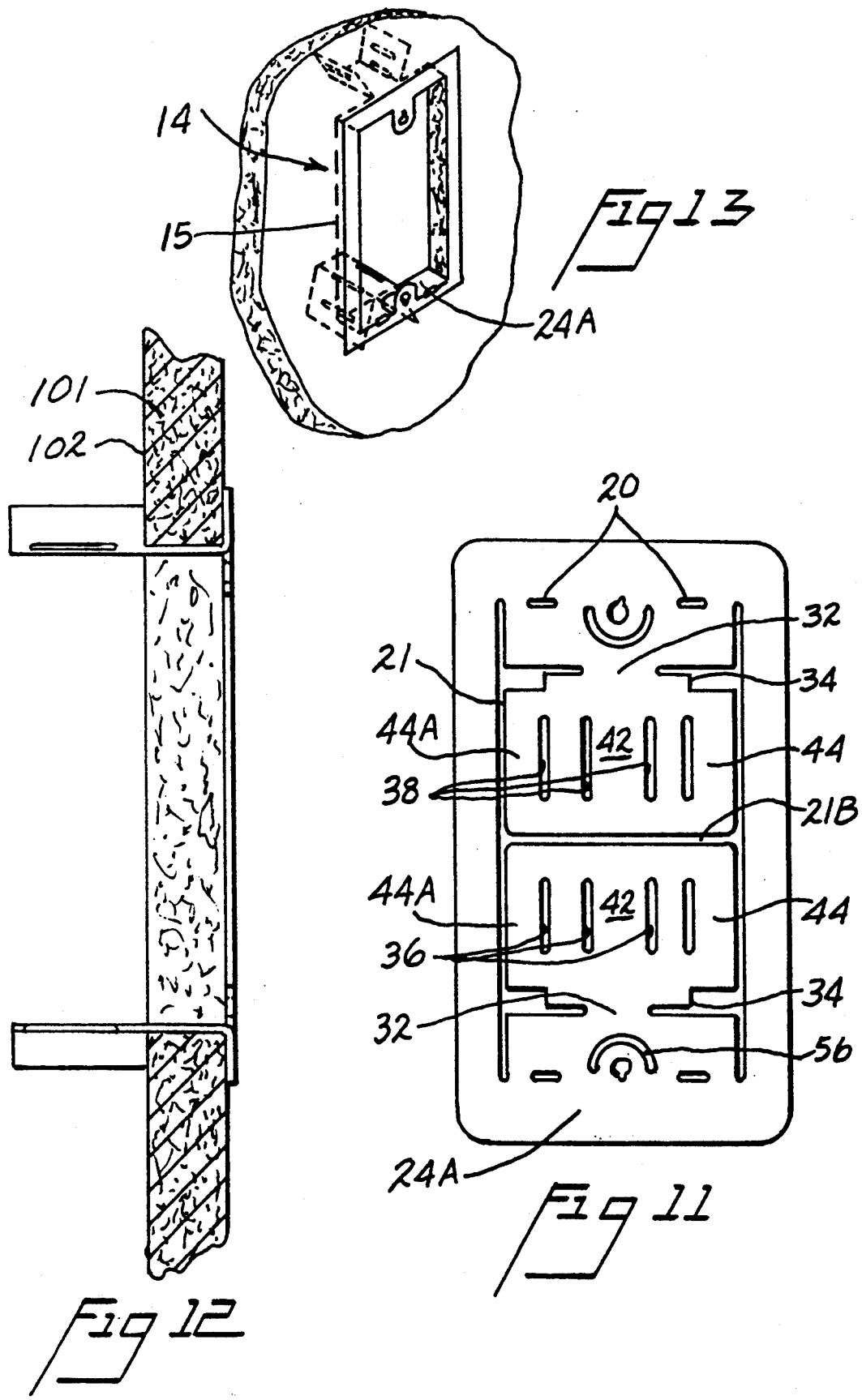

UNIVERSAL BACKPLATE FOR ELECTRICAL OUTLETS

This is a divisional of copending application Ser. No. 07/758,565 filed on Sep. 12, 1991, now U.S. Pat. No. 5,158,478.

FIELD OF THE INVENTION

The present invention pertains to a backplate having bendable tabs for positioning at an opening in a wall panel. More particularly, the tabs bend to form a support bracket for securing to the wall panel and holding a low voltage electrical outlet plate in position at the opening.

BACKGROUND OF THE INVENTION

Various brackets exist in the prior art for mounting low voltage electrical plates. For example, U.S. Pat. No. 4,863,399 to Medlin Jr. contains a pair of sidewalls and flat rectangular edge portions which are disposed in different planes, thereby somewhat complicating and increasing the expense related to manufacture.

In U.S. Pat. No. 4,576,431 to Thayer, there is disclosed a fixture having legs which are disposed from the sides of the fixture in staggered formation. This would prevent transverse movement of the fixture out of the wall opening and likewise prevent sideways movement, but would not appear to stabilize the fixture against vertical forces or movement.

U.S. Pat. No. 4,673,235 to Conley discloses a subplate having offsets, so that the device lies in more than one plane. Further, installation of the subplate requires a placement of screws in clearance holes of the subplate, then tightening screws through the wall panel and into the fastener hole of a tab on the inner surface of the wall. This may require a high degree of skill or, perhaps, a greater degree of frustration, since the artisan may not have access to the inner surface of the wall panel for securing the tab until a screw can be inserted and tightened.

U.S. Pat. No. 3,596,860 to MacKay, which requires a full length nail for securing the bracket to a stud would be entirely impractical if the securing surface was plaster board or any material other than a wooden stud.

Thus, the disclosures contained in each of the foregoing patents may be found to be unsatisfactory in many respects, among others, that the prior brackets or subplates may not be adapted for installation where wall panels are comprised of different materials, may not satisfactorily secure the subplate in the wall opening against vibrations and forces from different directions, may not be used without piercing the wall panel itself, or may otherwise be impractical in construction or manufacture, not sufficiently sturdy, too expensive and not commercially feasible.

In view of the various drawbacks and deficiencies in the prior art brackets, it is a general object of the present invention to provide a backplate for holding a low voltage electrical outlet plate in position at the opening in a wall panel, which backplate could be installed in wall panels having various compositions and thickness.

A further object of the invention is to provide a backplate having fastener holes corresponding to fastener holes of the low voltage electrical outlet plate which holes are positioned so that the fastener need not necessarily pierce the wall panel itself.

Another object of the invention is to provide a bracket for holding a low voltage electrical outlet plate which would obviate the necessity for placement of the screw or other fastener insertable in a fastener hole of a tab on the reverse side of the wall panel, since access by the artisan to hold the tab while inserting the fastener may be difficult or impossible.

Yet another object of the invention is to provide a backplate for a low voltage electrical outlet plate which could be secured at the opening of a wall panel against sideways or vertical movement of the backplate as well as transverse movement in or out of the wall panel opening.

An important objective of this invention is to provide a backplate adapted for manufacture by stamping a flat plate to provide slots forming bend lines, for bending the plate to form a support bracket, thereby achieving significant reductions in the complexity and expensive manufacture, delivery and storage of backplates.

These and other objects and advantages of the present invention will be made more apparent as the specification proceeds.

SUMMARY OF INVENTION

The invention comprises a backplate for positioning at the opening in a wall panel to hold a low voltage electrical outlet plate with one or more electrical sockets, while allowing communication between low voltage electrical wiring on the interior side of the wall panel with a telephone, television, computer or other plug with the socket thus secured.

The backplate may be manufactured from a single flat plate which would then be stamped, grooved or otherwise cut to form a series of intermittent slots through the plate forming bend lines. The bend lines define tabs extending from sidewalls comprising a frame and forming a support bracket.

In a first embodiment, the support bracket incorporates two pairs of tabs extending from side walls forming a rectangular frame to surround a rectangular central opening. A first pair of tabs has a first bend line formed by slots and second bend line formed by a narrowed portion along the width of each of the tabs in that first pair. The first embodiment of the invention is modified slightly by providing cut-away portions in the first pair of tabs so that in the second embodiment, the first pair of tabs may have a first bend line formed by slots, while a second bend line is formed by combination of a narrowed portion and cut-away portion of the tabs.

Meanwhile, in a third embodiment, a pair of opposed L-shaped tabs, which are comprised of leg and foot portions, depend from the shorter side walls of the rectangular frame such that the tab may be bent on the length of the leg and again longitudinally on a width of the leg. Similarly, a modification of this third embodiment forms a fourth embodiment which includes longitudinal slots formed distal to a second bend line, and the longitudinal slots are adapted for forming projecting wings to clasp against the inner surface of the wall panel and secure the support racket to the wall panel.

In all embodiments of the invention, fastener holes are provided for holding a low voltage electrical outlet plate and the holes are positioned to obviate the necessity for piercing the wall panel itself.

BRIEF DESCRIPTION OF THE DRAWINGS

FIG. 1 is a planar view of a subplate embodying the present invention;

FIG. 2 is a perspective view illustrating an installed backplate formed as a support bracket with its legs bent to secure the bracket within to a wall panel;

FIG. 3 is a side edge view showing installation of the electric outlet plate with screws insertable in the plate and backplate without piercing the wall panel;

FIG. 6 is a front elevational view illustrating a modified construction for the first embodiment of the invention as depicted in FIG. 1;

FIG. 7 is a side edge view of the subplate illustrating the device as constructed as a flat plate in a single plane;

FIG. 8 is a front elevational view generally illustrating the support bracket of FIG. 7 as a double plate installation;

FIG. 9 is a front elevational view of a back-plate formed in accordance with a second embodiment of the invention wherein a series of slots define a pair of opposed tabs, each opposed tab extending from a shorter side wall and being L-shaped with slots forming first, second and third bend lines;

FIG. 10 is a perspective view of the embodiment illustrated in FIG. 9 depicting an installed back-plate with its L-shaped tabs bent for securing the backplate to an inner surface of the wall panel;

FIG. 11 is a front elevational view of a modification of the second embodiment of the invention;

FIG. 12 illustrates a side edge view of the modification of the second embodiment as depicted in FIG. 11, and generally illustrates an installed back-plate with its projecting wings bent on the longitudinal bend line to secure the backplate to an inner surface of the wall panel; and FIG. 13 is a perspective view illustrating how the modification of the second embodiment of the invention, shown in FIG. 11 and FIG. 12, is installed in the wall panel, with its projecting wings bent to secure the backplate to an inner surface of the wall panel.

DETAILED DESCRIPTION OF THE INVENTION

Figure 4:
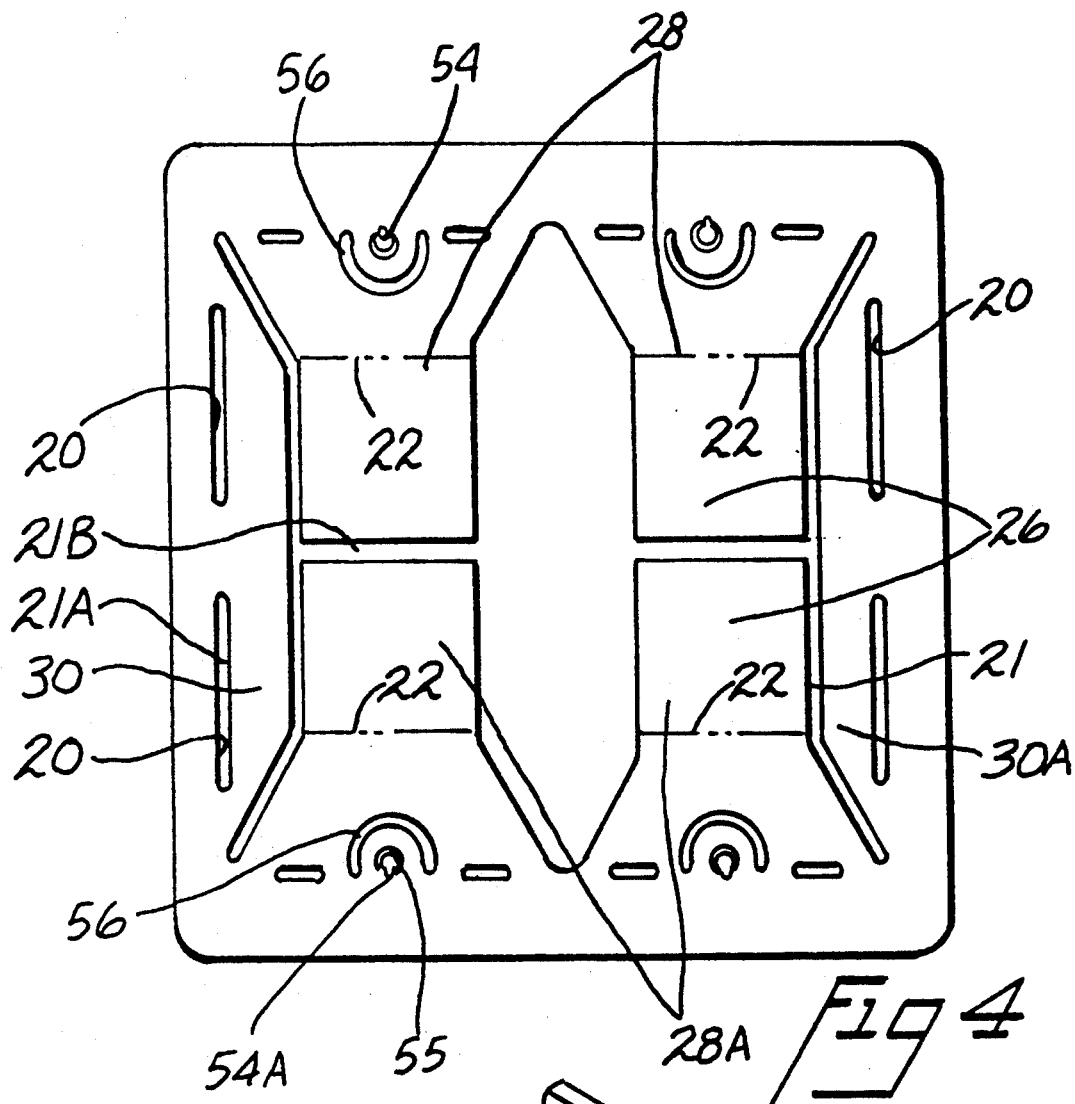
FIG. 4 is a front elevational view generally illustrating a double plate installation.

Referring first to FIG. 1, the backplate 10 of the present invention is formed from a flat plate having a generally rectangular shape and may be formed of sheet metal in a single press operation by means of an appropriately dimensioned die. And in the same single press procedure, a series of slots 18 and elongated slits 21,21A,21B are simultaneously grooved through the backplate 10 to form bend lines 20,20A, and further, to define side walls 24, 24A, a first pair of opposed tabs 28,28A, and a second pair of opposed tabs 30,30A.

The fact that the backplate 10 of this invention is formed of a flat plate which lies in a single plane facilitates packing the device for shipment to wholesalers and retailers. The backplates may easily be stacked upon one another with significant reduction in volume of packing boxes and shipment costs. Additionally, the fact that the backplate is constructed as a flat plate for formation into a support bracket by the end user, further expedites retail display and speed in converting the device to a support bracket at a construction site.

As shown in FIG. 1, the series of intermittent slots 18 and elongated slits 21,21A,21B which are formed in the backplate 10 simultaneously form the tabs 26 and side walls 24,24A, so that when the backplate is positioned at the opening of a wall panel 103 or other planar surface, the tabs 26 may be bent inward and into the wall panel at the first bend line 20 formed by slots 18. At that point, when the tabs 28,28A have been bent inward along the first bend lines, they project essentially orthogonal to the plane of the plate 12 and form a large, rectangular central opening 16 surrounded by the side walls 24,24A which form a rectangular frame 15. In accordance with this first embodiment of the invention, the first pair of tabs, 28,28A have greater length than a second pair of tabs 30,30A. The first pair of tabs 28,28A depend from the shorter side walls 24A of the rectangular frame 15. The elongated slits 21,21A outline the first pair and second pair of opposed tabs, thereby allowing the tabs 26 to be easily bent away from the backplate 10 and into an opening in the wall panel 103 or other planar surface. Slot 21B separates the first pair of opposed tabs 28,28A from one another. Meanwhile, a second bend line 22 is formed in each of the tabs of the first pair of opposed tabs 28,28A depending from the shorter side wall 24A of the rectangular frame 15 at a point where a narrowed portion is formed along the width of the tabs. While that narrowed portion serves as a second bend line 22 it adapts the longer pair of tabs 28,28A for bending the narrowed portion orthogonal to the first bend 20 for fitting the narrowed portion of the tab against an inner surface 102 of the wall panel so as to have a clamping action of the tab against that inner surface to secure the support bracket 14 at the opening in the wall panel 103.

Referring now to FIG. 2, when all four tabs 26 of the bracket 14 have been bent inward and into the opening of the wall panel, there is formed a large rectangular central opening 16 surrounded by the side walls 24,24A. The tabs depending from each of the four side walls 24,24A secure the bracket 14 against side-to-side movement and vertical forces and movement. Likewise, the second bend line 22 of each of the longer tabs 28,28A secures the support bracket 14 at the opening 103 against transverse movement in or out of the opening.

In FIG. 3, there is shown a backplate 10 secured to a wall panel 103 for the purpose of holding a television socket 107 at the opening in the wall panel and simultaneously retaining a television outlet plate 105 which is held in position by screws 33,33A inserted through corresponding fastener openings in the outlet plate 105 and the support bracket 54,54A.

Figure 5:
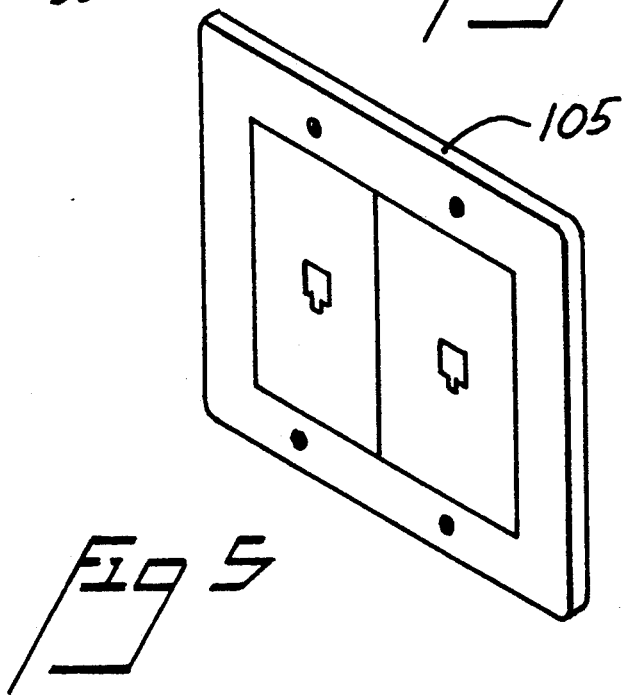
FIG. 5 is a three-quarter elevational view illustrating a television antenna outlet plate mounted and fully secured to the backplate ready for use.

As depicted in FIG. 4 and FIG. 5, the backplate 10 may be constructed to have sufficient dimensions for a double plate installation, or an installation for retaining three, four or more outlet plates. And when the backplate 10 having larger dimensions is formed, there are two pair of opposed longer tabs, and one pair of opposing shorter tabs 30,30A formed to abut sides of the wall panel opening 103. Thus, two outlet plates may be held in position by a single support bracket, FIG. 5.

The second embodiment of the invention is depicted in FIG. 6, FIG. 7 and FIG. 8. There the backplate 10 of the invention is again constructed from a flat plate, however, there are cut-out portions in each of the longer opposed tats 28,28A thereby expediting bending the tabs along a second bend line 22 at a narrowed, cut-away portion of each of the opposed longer tabs.

Referring now to FIG. 9, there is depicted a third embodiment of the invention, wherein the means for forming the support bracket from the backplate and for securing the backplate at the opening in the wall panel comprises a single pair of L-shaped tabs 46,46A, each of which has a shorter foot portion 48 and longer leg portion 50, and each foot portion 48 extends from a shorter side wall 24A with the leg 50 extending orthogonally from the foot toward an adjacent side wall. These L-shaped tabs 46,46A have slots 18 intermittently grooved therein to form first, second and third bend lines; i.e. the first bend line 20 is formed between the foot portion 48 of the L-shaped tab and the shorter side wall 24A from which it depends, thereby adapting the tab 26 for bending inward from the plane of the plate to form the support bracket 14. A second bend line 22 is preferably located between the foot and leg portions, so that the leg portion 50 of each the L-shaped tab 46,46A can rotatively bend on its length on the inside of the wall panel 103. A third bend line 51 is formed by slots grooved longitudinally on the leg portion to define a longitudinal flange 52 adapted for bending on the third bend line against an inner surface 102 of the wall panel 101 to clamp the panel and secure the support bracket 14 to the wall panel. The foot portion 48 of the L-shaped tab preferably depends from a shorter side wall 24A of the rectangular frame 15 and should preferably extend from a point adjacent an end of that shorter side wall. After the L-shaped tabs 46,46A have been bent inward over the wall panel on its first bend line 20, the fact that the foot portion 48 depends from the shorter side wall closer to an end thereof, further prevents sidewise movement of the support bracket 14 once it is secured within the opening 103 of the wall panel 101 or other planar surface.

FIG. 11, FIG. 12 and FIG. 13 depict a fourth embodiment of the invention, wherein a single pair of opposing tabs is again provided, each tab depending from a shorter side wall 24A. However, each of the opposing tabs includes a second bend line 22 formed by traverse notches 34 cut into the sides of each of the tabs to form the narrowed portions. In this fourth embodiment, there is also included a plurality of longitudinal slots 36 grooved through the tabs to form longitudinal bend lines 38 which are positioned distal to the narrowed portion 32 formed by the transverse notches 34, and the longitudinal bend lines 38 adapt each of the opposed tabs 28,28A for bending on its width along the longitudinal bend lines to form radially projecting wings 44,44A. These radially projecting wings are adapted for fitting against an inner surface 102 of the wall panel 101. Preferably, four longitudinal slots 36 are grooved in each of the pair of tabs 28, 28A for forming the longitudinal bend lines, so that a pair of wings project from either side of the central portion 42, and each of the pair of radially projecting wings 44,44A are adapted for bending out of the plane of the central portion 42, and further out of the plane of the tab, to be fitted against an inner surface 102 of the wall panel 101 for securing the support bracket to the wall panel as depicted in FIG. 12 and FIG. 13.

All of the embodiments described above incorporate a pair of collinear fastener holes 54,54A which are positioned interior of the series of slots 18 forming the first bend lines 20. The collinear fastener holes 54,54A are drilled through the flat rectangular plate 12 and the holes are surrounded by a curved slot 56 through the plate adapting the fastener holes 54,54A to remain in the plane of the backplate 10 after the tabs 26 are bent inward, so that the fastener holes may receive mounting screws 33,33A insertable in corresponding holes in the low voltage electrical outlet plate 105. The fastener holes may preferably be formed as a thin disk 55, i.e., a disk formed of sacrificial material stamped thinner than that of the surrounding plate and having a small central opening, so that a screw fitted into the corresponding hole in a low voltage electrical outlet plate may be threadably tightened by means of the sacrificial material into the fastener hole in the support bracket 14. The thin sacrificial disk 55 formation of the fastener hole 54 eliminates the need for fastener clips to secure the mounting screws, for the screws 33,33A engage sacrificial material within the opening as the screw is rotated. Of course, the collinear fastener holes are spaced apart from each other at distance corresponding to the spacing of screw holes on a low voltage electrical outlet plate.

When in use, the backplate 10 of the invention is suitably placed in juxtaposition to the opening of a wall or other surface or panel, whereupon the tabs are manually bent inward on the first bend lines 20 defined by slots 18, thereby forming support bracket 14 with rectangular frame 15. The low voltage electrical wiring may then be received through the centralized opening 16 surrounded by the sidewalls 24.

Depending on the embodiment employed, the first pair of tabs are again bent inward of the wall panel on the second and/or third bend lines; or, in the case of the third embodiment, the L-shaped tabs 46,46A are bent on a second bend line 22 on the width of the leg 50 and again on the longitudinal bend line 51 of the leg to form the longitudinal flange 52 to clasp against the inner surface of the wall panel or other surface.

In the fourth embodiment of the invention, after the first bend, the tab is bent along its width on the longitudinal bend lines 38, thereby forming a central wing portion 42 and projecting wings 44,44A depending from either side of the central wing portion.

When the first or second embodiment is employed, the second pair of opposed tabs 30,30A are likewise bent inward on first bend lines 20 thereby securing the support bracket 14 against sidewise movement within the opening of the wall panel or other planar surface.

The support bracket 14 is thus prepared for insertion of screws 33,33A in corresponding holes in a low voltage electrical outlet plate 105 and support bracket 14 for mounting of the outlet plate on the bracket. The screws are threadably engaged in the smaller central openings of the thin disk 55 formed of sacrificial material and threadably tightened as the sacrificial disk 55 material is pushed away to tightly mount the outlet plate 105 on the support bracket 14.

The terms and expressions which have been used herein are to be interpreted as terms of description and not of limitation, since there is no intention in the use of such terms and expressions of excluding any equivalents of any of the features shown or described, or any portion thereof, and it is recognized that various modifications are possible within the scope of the invention claimed.

What is claimed is:

1. A rectangular backplate, for holding a low voltage electrical outlet plate against an opening in a wall panel or other planar panel having inner and outer surfaces, formed from a flat plate in a single press operation by means of an appropriately dimensioned die, comprising:
a pair of opposed tabs defined by a pair of parallel, longitudinal slits connected by a transverse slit through said backplate, each tab of said opposed pair of tabs depending from a shorter side of said rectangular backplate, and having first, second and third bend lines;

said first bend lines formed by a plurality of intermittent slots through said backplate where each tab depends from its respective side of said rectangular backplate, to define sidewalls of a support bracket with a rectangular frame surrounding a centralized opening when each tab is bent, along said first bend lines, to project orthogonal to the plane of said backplate;

each of said pair of opposed tabs having a narrowed portion defined by transverse notches forming second bend lines, and further having a plurality of longitudinal slots through each tab to form third bend lines, for bending each of the opposed tabs on its width, along said third bend lines, for forming radially projecting wings to fit against and clamp an inner surface of a wall panel and secure the support bracket to the wall panel;

a pair of collinear fastener holes drilled through said flat rectangular backplate in the area where each of said pair of tabs depends from and is contiguous with its respective shorter side of said rectangular backplate, each of said fastener holes surrounded by a curved slot in said backplate adapting the backplate immediately adjacent and surrounding said fastener holes to remain in the plane of said backplate after bending the tabs on said first bend lines, said fastener holes further adapted to threadably receive mounting screws inserted into said backplate, said fastener holes positioned interior of said first bend lines defining said sidewalls of said rectangular plate and spaced apart to correspond with holes in said electrical outlet plate; and a pair of collinear thin disks formed of sacrificial material within said fastener holes, each disk of said pair of disks having a very small central opening, spaced apart to correspond with holes in said electrical outlet plate, and each disk of said pair of collinear thin disks adapted to receive a mounting screw which engages said sacrificial material as said screws are rotated to threadably tighten an electrical outlet plate against said support bracket.

* * * * *